US012240100B2

(12) United States Patent
Saez et al.

(10) Patent No.: US 12,240,100 B2
(45) Date of Patent: Mar. 4, 2025

(54) CONTROLLED COMPLIANT GRIPPING AND MANIPULATING SYSTEM FOR A ROBOT

(71) Applicant: GM Global Technology Operations LLC, Detroit, MI (US)

(72) Inventors: Miguel Arturo Saez, Clarkston, MI (US); John Patrick Spicer, Plymouth, MI (US); Muhammad E. Abdallah, Farmington Hills, MI (US); James W. Wells, Rochester Hills, MI (US); Tom Malburg, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 615 days.

(21) Appl. No.: 17/550,217

(22) Filed: Dec. 14, 2021

(65) Prior Publication Data

US 2023/0182301 A1 Jun. 15, 2023

(51) Int. Cl.
*B25J 15/00* (2006.01)
*B25J 17/02* (2006.01)

(52) U.S. Cl.
CPC ....... *B25J 15/0028* (2013.01); *B25J 17/0208* (2013.01)

(58) Field of Classification Search
CPC ........ B25J 9/0087; B25J 9/009; B25J 9/0093; B25J 9/0096; B25J 9/1682; B25J 13/006; B25J 15/0028; B25J 17/0208
See application file for complete search history.

(56) References Cited

U.S. PATENT DOCUMENTS

| | | | | |
|---|---|---|---|---|
| 2005/0036879 A1* | 2/2005 | Jhaveri | ................. | B25J 9/1682 414/751.1 |
| 2009/0123264 A1* | 5/2009 | Hartmann | .............. | B25J 9/1682 414/798.2 |
| 2013/0158697 A1* | 6/2013 | Stone | ........................ | B64F 5/50 29/897 |
| 2015/0118003 A1* | 4/2015 | Bacalia | ...................... | B25J 9/00 414/816 |
| 2017/0036343 A1* | 2/2017 | Sturm | ..................... | B25J 9/009 |

* cited by examiner

*Primary Examiner* — Saul Rodriguez
*Assistant Examiner* — Brendan P Tighe
(74) *Attorney, Agent, or Firm* — CANTOR COLBURN LLP

(57) ABSTRACT

A compliant end effector includes a robot mounting bracket and a component support member. The component support member includes a side surface and a top surface. A component clamping system includes a first clamp member operable to move toward the side surface of the component support member and a second clamp member operable to move toward the top surface of the component support member. A controller is operatively connected to the clamping system. The controller is configured to engage the first and second clamp members as the component gripping and manipulating system is in a set position and release the first clamp member and the second clamp member allowing a portion of a component held by the component clamping system to move with one or more degrees of freedom when the component gripping and manipulating system is moving to the set position.

20 Claims, 5 Drawing Sheets

CONTROLLED COMPLIANT GRIPPING AND MANIPULATING SYSTEM FOR A ROBOT

INTRODUCTION

The subject disclosure relates to the art of manufacturing robots and, more particularly, to a controlled compliant gripping and manipulating system for a robot.

Robots are often used in manufacturing processes. Robots may be used to weld, install components, operate fasteners, perform inspections, and the like. In some environments, robots may include two or more gripping devices that hold and/or manipulate an object. In other environments, two or more robots may hold an object. Robots with two or more gripping devices do not require complex coordination schemes. That is, the robot can control each gripping deice to hold the object. When two or more robots hold an object, coordination is required to reduce imparting undesired stresses.

Coordinating actions of two or more robots requires sensors, feedback circuits, and complex programming. A mismatch in position between two robots holding a single object can induce strain that may result in cracking, broken welds, or other damage. Further, any mismatch in position could lead to the mis-application of a component, a formation of an undesirable opening, or a weld bead being either misaligned from a preplanned location or laid down at an undesirable location. Accordingly, the industry would welcome a system that can easily and simply coordinate operation between two different robots manipulating the same object without imparting undesirable stresses.

SUMMARY

In accordance with one non-limiting example, a compliant end effector for a component gripping and manipulating system includes a robot mounting bracket mountable to a robot manipulating arm, and a component support member connected to the robot mounting arm. The component support member includes a side surface and a top surface. A component clamping system includes a first clamp member operable to move toward the side surface of the component support member and a second clamp member operable to move toward the top surface of the component support member. A controller is operatively connected to the clamping system. The controller is configured to engage the first and second clamp members as the component gripping and manipulating system is in a set position and release the first clamp member and the second clamp member allowing a portion of a component held by the component clamping system to move with one or more degrees of freedom when the component gripping and manipulating system is moving to the set position.

In addition to one or more of the features described herein the component support member includes a first component support member having a first side surface and a first top surface and a second component support member having a second side surface and a second top surface, wherein the first clamp member is operable to move toward the first side surface.

In addition to one or more of the features described herein the component support member includes a first support element fixedly mounted relative to the robot mounting bracket and a second support member engageable with a supported component.

In addition to one or more of the features described herein the second support element is shiftable relative to the first support element.

In addition to one or more of the features described herein the second support element includes the side surface and the top surface.

In addition to one or more of the features described herein the first clamp member urges the supported component against the side surface of the second support element.

In addition to one or more of the features described herein the second clamp member urges the supported component against the top surface of the second support element.

In addition to one or more of the features described herein the second clamp member comprises a rotatable arm connected to a rotary actuator.

In addition to one or more of the features described herein the first clamp member comprises a piston coupled to a linear actuator.

In addition to one or more of the features described herein a component ground system is supported by the component support, the component ground system providing an electrical ground to a supported component.

Also disclosed in accordance with a non-limiting example, is a component gripping and manipulating system including a first robot having a first component end effector fixedly connected to a first end of a component and a second robot having a second component end effector compliantly connected to a second end of the component. The second component end effector includes a robot mounting bracket connected to the second robot and a component support member connected to the robot mounting arm. The component support member includes a side surface and a top surface. A component clamping system includes a first clamp member operable to move toward the side surface of the component support member and a second clamp member operable to move toward the top surface of the component support member. A controller is operatively connected to the clamping system. The controller is configured to engage the first and second clamp members as the component gripping and manipulating system is in a set position and release the first clamp member and the second clamp member allowing a portion of a component held by the component clamping system to move with one or more degrees of freedom when the component gripping and manipulating system is moving to the set position.

In addition to one or more of the features described herein the component support member includes a first component support member having a first side surface and a first top surface and a second component support member having a second side surface and a second top surface, wherein the first clamp member is operable to move toward the first side surface.

In addition to one or more of the features described herein the component support member includes a first support element fixedly mounted relative to the robot mounting bracket and a second support member engageable with a supported component.

In addition to one or more of the features described herein the second support element is shiftable relative to the first support element.

In addition to one or more of the features described herein the second support element includes the side surface and the top surface.

In addition to one or more of the features described herein the first clamp member urges the supported component against the side surface of the second support element.

In addition to one or more of the features described herein the second clamp member urges the supported component against the top surface of the second support element.

In addition to one or more of the features described herein the second clamp member comprises a rotatable arm connected to a rotary actuator.

In addition to one or more of the features described herein the first clamp member comprises a piston coupled to a linear actuator.

In addition to one or more of the features described herein a component ground system is supported by the component support, the component ground system providing an electrical ground to a supported component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
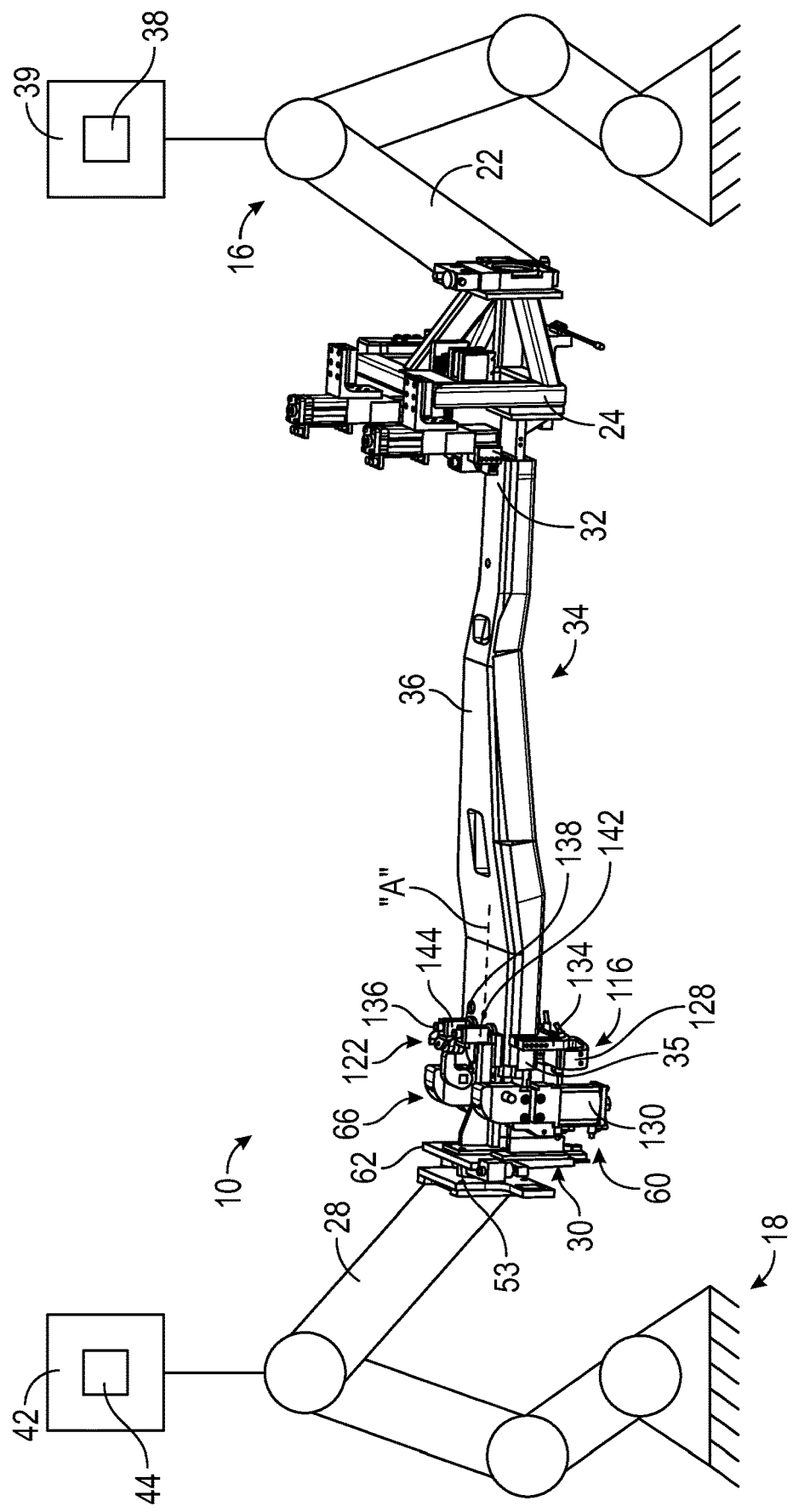
FIG. 1 depicts a perspective view of a controlled component gripping system, in accordance with a non-limiting example.
Figure 2:
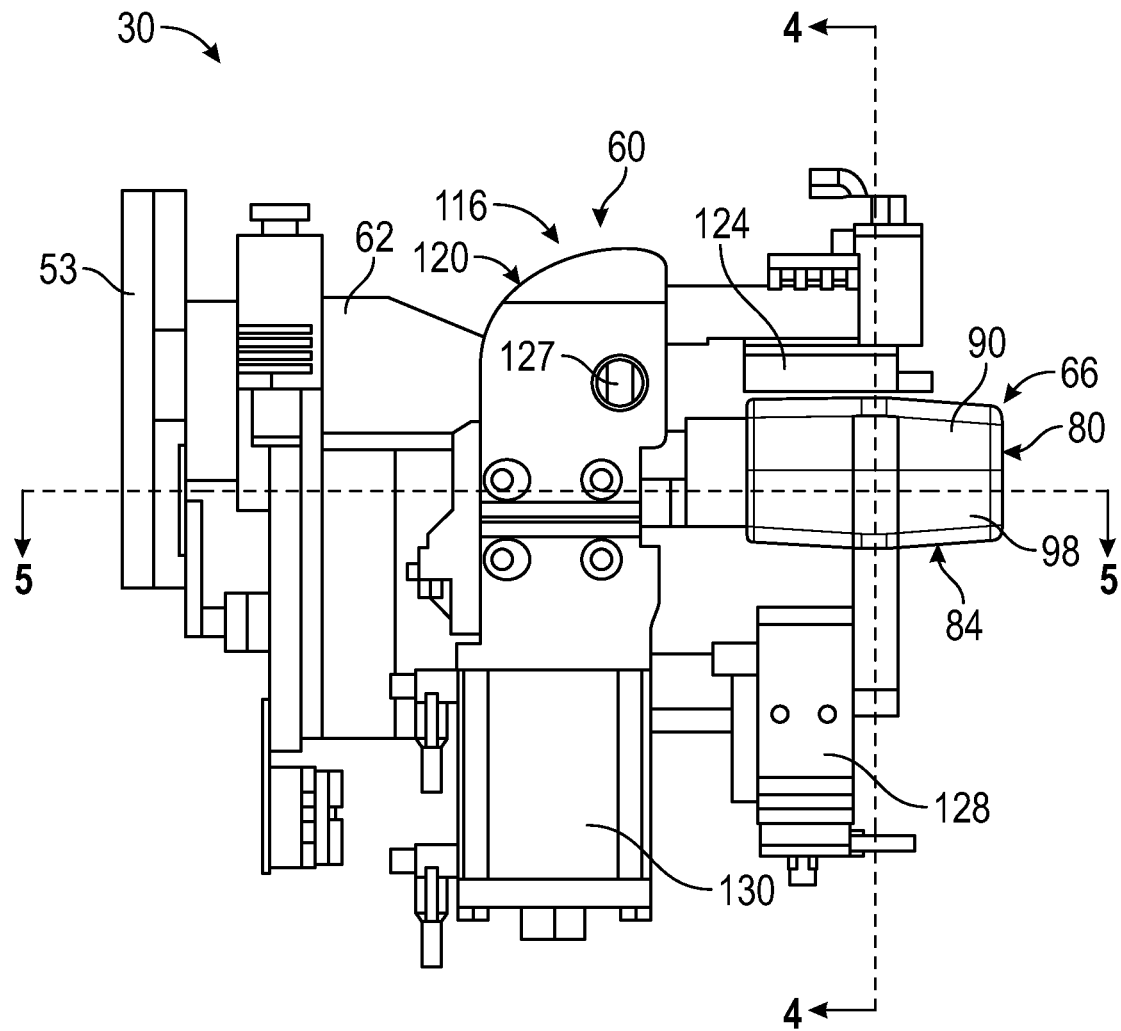
FIG. 2 depicts a plan view of a compliant end effector of the controlled component gripping system of FIG. 1, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Component gripping and manipulating system, in accordance with a non-limiting example, is indicated generally at 10 in FIG. 1. Component gripping and manipulating system 10 includes a first robot manipulator 16 spaced from a second robot manipulator 18. First robot manipulator 16 includes a first manipulating arm 22 having affixed thereto a first end effector 24. Second robot manipulator 18 includes a second manipulating arm 28 having a second end effector 30. Each robot manipulating arm 16 and 18 and associated end effector 24, 30 is an independent device whose control may be orchestrated to manipulate a single component.

As will be detailed herein, in accordance with a non-limiting example, first end effector 24 is a fixed end effector, i.e., when connected, the end effector holds the component such that movement in in any degree of freedom (e.g., up/down; left right; and/or in/out) is inhibited at all times. In contrast, second end effector 30 is a compliant end effector, i.e., the end effector holds the component in loosely or in a manner that allows movement in one or more degrees of freedom while being manipulated. That, with the compliant end effector, the component is still supported but allowed some movement so that stresses are not induced during manipulation. More specifically, the freedom of movement at one end prevents stresses being induced into the component during manipulation resulting from any mis-match or a lack of synchronization between first robot manipulator 16 and second robot manipulator 18.

In a non-limiting example, first end effector 24 is fixedly connected to a first end 32 of a component 34 and second end effector 30 is compliantly connected to a second, opposing end 35 of component 34. In a non-limiting example, component 34 is shown in the form of a frame rail 36 undergoing a manufacturing process. In a non-limiting example, a first control system 39 having a first control module 38 is connected to first robot manipulator 16 and a second control system 42 having a second control module 44 is connected to second robot manipulator 18. First and second control systems 39 and 42 direct first and second robot manipulators 16 and 18 to manipulate frame rail 36 into a position for a manufacturing step, such as part attachment, welding, and the like, based on instructions received by, or stored in, first and second control modules 38 and 44.

Reference will now follow to FIGS. 2-5 with continued reference to FIG. 1, in describing second end effector 30 in accordance with a non-limiting example. Second end effector 30 includes a robot mounting bracket 53 that serves as an interface with second manipulating arm 28. In a non-limiting example, a component support and clamping system 60 is supported by robot mounting bracket 53. Component support and clamping system 60 includes a support bracket 62 to which is connected a component support 66.

Figure 3:
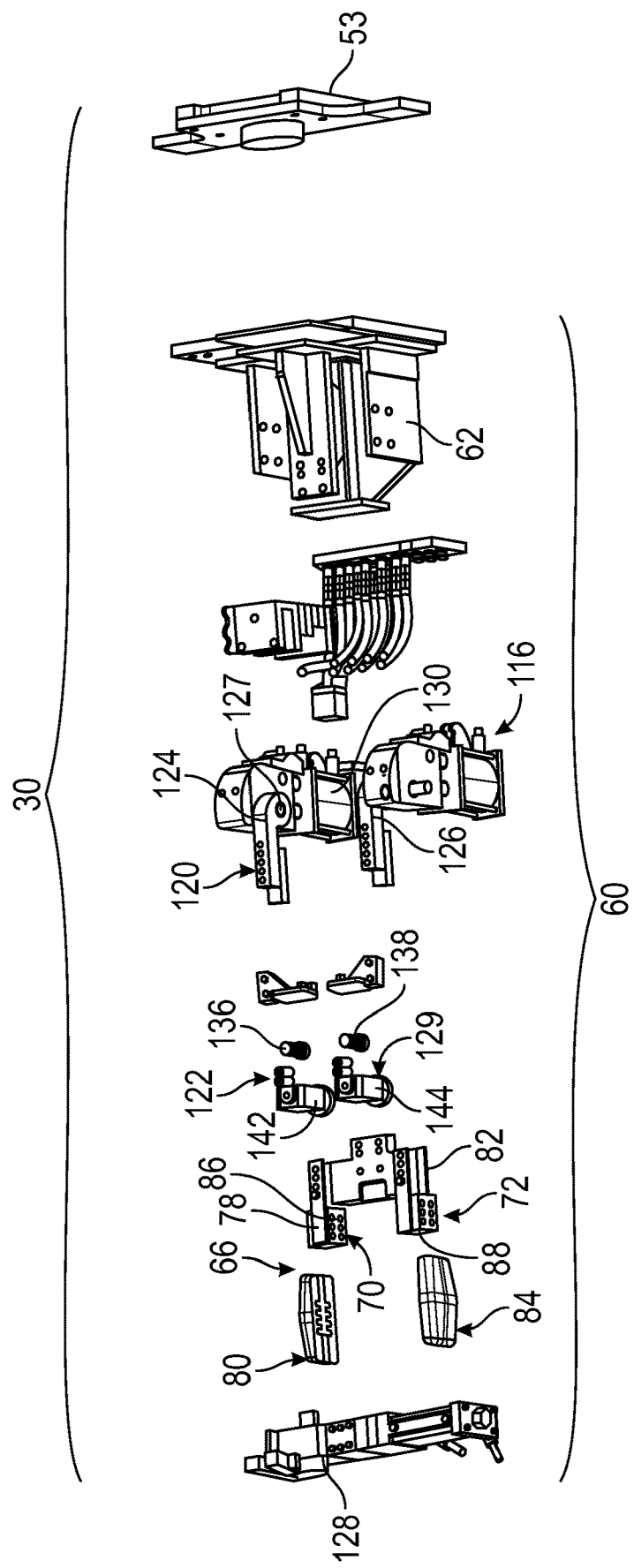
FIG. 3 depicts a disassembled view of the compliant end effector of the controlled component gripping system of FIG. 2, in accordance with a non-limiting example.
Figure 5:
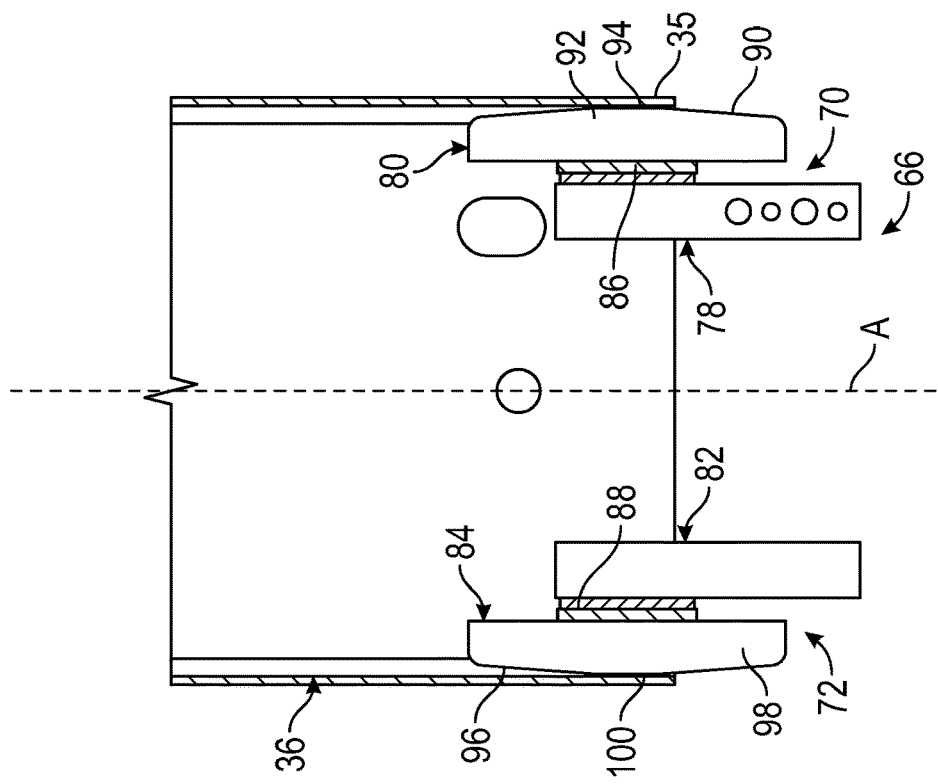
FIG. 5 is a partial cross-sectional top end view of the compliant end effector of FIG. 2 taken along the line 5-5, in accordance with a non-limiting example.
Figure 4:
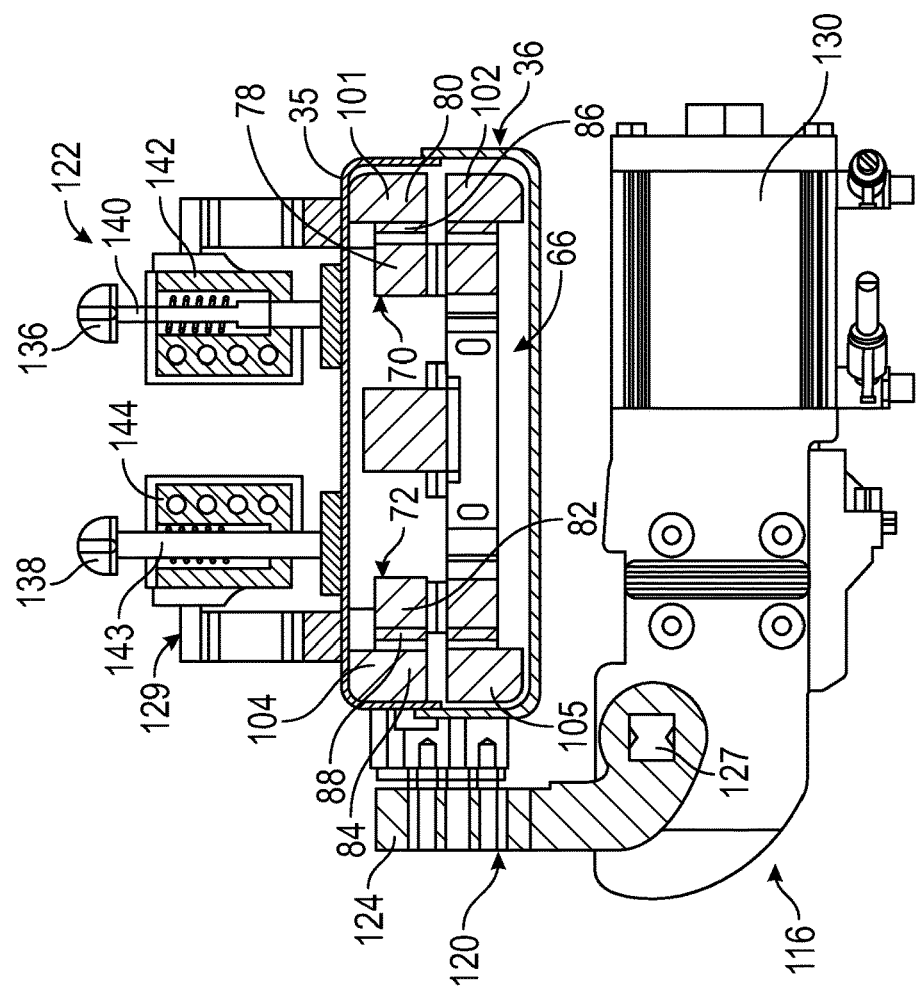
FIG. 4 is an end view of the compliant end effector of FIG. 2 taken along the line 4-4, in accordance with a non-limiting example.

In a non-limiting example shown in FIG. 3, component support 66 includes a first component support member 70 and a second component support member 72. First component support member 70 is fixed relative to second component support member 72. First component support member 70 and second component support member 72 are sized and spaced from one another so as to be inserted into second end 35 of frame rail 36 as shown in FIGS. 4 and 5. First and second support members 70 and 72 selectively float within second end 35 of frame rail 36. In a non-limiting example depicted in FIGS. 3-5, first component support member 70 includes a first support element 78 and a second support element 80. Similarly, second component support member 72 includes a first support element 82 and a second support element 84.

In a non-limiting example, second support element 80 of first component support member 70 may transition relative to first support element 78 along an axis "A" (FIG. 5) through an interaction of first bearings 86. Likewise, second support element 84 of second component support member 72 may transition relative to first support element 82 through an interaction of second bearings 88. In this manner, frame rail 36 may translate along a first degree of freedom defined by axis "A" while being manipulated. In a non-limiting example, second support element 80 of first component support member 70 includes a first side surface 90 and a first top surface 92. First side surface 90 incudes a first angled surface portion 94.

In a non-limiting example, second support element 84 of second component support member 72 includes a second side surface 96 and a second top surface 98. Second side surface 96 includes a second angled surface portion 100. First and second angled surface portions 94, 100 limit an amount of surface area of each second support element 80, 84 in order to reduce frictional forces that may inhibit movement of frame rail 36 relative to first component support member 70 and second component support member 72.

In a non-limiting example shown in FIG. 4, first component support member 70 may include a first upper support 101 and a first lower support 102. First upper support 101 may be defined by, for example, first and second support elements 78 and 80. First lower support element 102 may be defined by third and fourth lower support elements (not separately labeled). Similarly, second component support member 72 may include a second upper support 104 and a second lower support 105. Second upper support 104 may be defined by first and second support elements 82 and 84. While second lower support 105 may be defined by third and fourth lower support elements (not separately labeled). While shown as being formed from upper and lower support elements, each component support member 70 and 72 may be formed by a single member.

In a non-limiting example, a component clamping system 116 is supported by component support and clamping system 60. Component clamping system 116 includes a first clamp member 120 and a second clamp member 122. First clamp member 120 includes a first clamp 124 as shown in FIG. 4 and a second clamp 126 (FIG. 3). First clamp 124 is connected to a drive shaft 127 rotated by a rotary actuator 130. Second clamp 126 includes corresponding structure. First and second clamps 124 and 126 are supported by a structure 128. When rotary actuator is activated, clamp 124 moves into contact with and urges or forces frame rail 36 toward second side surface 96 of second support element 84. When activated, second end 35 of frame rail 36 is locked or fixedly supported by second end effector 30.

In a non-limiting example shown in FIG. 4, second clamp member 122 takes the form of a component grounding system 129 including a first clamp component 136 and a second clamp component 138. First clamp component 136 takes the form of a first piston 140 connected to a first linear actuator 142 and second clamp component 138 takes the form of a second piston 143 connected to a second linear actuator 144. When activated, first and second liner actuators 142 and 144 drive or urge first and second clamp components 136 and 138 against first top surface 92 of first component support 70 and second top surface 98 of second component support 72 establishing an electrical ground to support welding operations and further lock second end 35 of frame rail 36 to second end effector 30.

In operation, while frame rail 36 is being moved between selected static positions second control module 44 releases first clamp member 120 and second clamp member 122. When released, second end 35 of frame rail 36 may float or move with one or multiple translational and/or rotational degrees of freedom relative to first component support 70 and second component support 72. In a non-limiting example, second or compliant end effector 30 may include sensors that measure linear and/or rotational displacement in the one or multiple degrees of freedom of the end of frame rail 36. The sensors may provide feedback to, for example, second control system 42, indicating an amount of movement of second end 35 of frame rail 36 when being manipulated in order to detect and/or stop any over or excessive travel conditions. In a non-limiting example, second end 35 of frame rail 36 may move with at least three degrees of freedom, fore/aft, up/down, and side to side relative to first component support 70 and second component support 72. Thus, any mismatch in movement, no matter how small or large, will not be input to frame rail 36 causing stress that may create internal weaknesses.

When first and second robot manipulators 16 and 18 position frame rail 36 in a selected orientation for a manufacturing step, first control module 38 clamps first end 32 of frame rail 36 and second control module 44 activates first and second clamp members 120 and 122 to clamp second end 35 of frame rail 36. At this point, another robot(s), not shown, may apply a weld bead, install a fastener, form an opening or the like. The another robot(s) may use machine vision to locate a specific area on frame rail 36 or, in a non-limiting example, may receive feedback from sensors indicating a specific location(s) on frame rail 36 including any offset attributable to second end effector 30. Once the manufacturing step is complete, second control module 44 releases first and second clamp members 120 and 122 allowing second end 35 of frame rail 36 to float with one or multiple degrees of freedom while frame rail 36 is being manipulated into position for the next manufacturing step.

Figure 6:
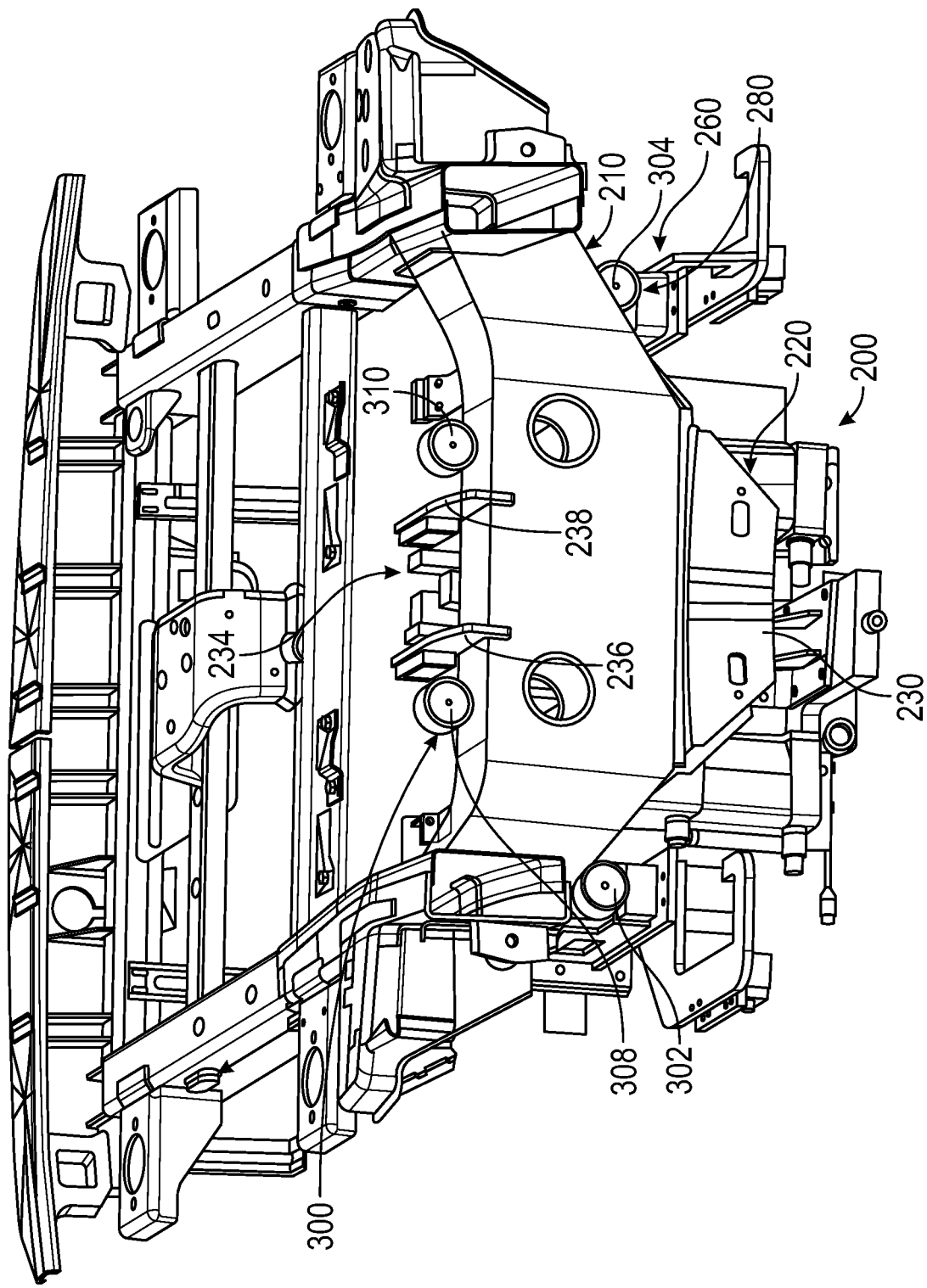
FIG. 6 depicts a perspective view of a compliant end effector of the controlled component gripping system, in accordance with a non-limiting example.

At this point, it should be understood that various modifications may be made. For example, as shown in FIG. 6, a compliant end effector 200 may be designed to retain and manipulate larger components such as, for example, a vehicle frame 210. Compliant end effector 200 includes a component support 220 including a first component support 230 and a second component support 234. Second component support 234 may include a first support element 236 and a second support element 238. Component support 220 loosely retains vehicle frame 210 while being manipulated between select positions. Compliant end effector 200 also includes a component clamp system 260 including a first clamp member 280 and a second clamp member 300.

First clamp member 280 includes a first clamp 302 and a second clamp 304 shown in the form of rollers (not separately labeled). Second clamp member 300 includes a third clamp 308 and a fourth clamp 310 shown in the form of rollers (also not separately labeled). First and second clamp members 280 and 300 secure vehicle frame 210 when undergoing a manufacturing process but, in a manner similar to that discussed herein, release the clamping force during manipulation of vehicle frame 210 so as to eliminate stresses that may be caused by a mis-match in movement between robots. In the non-limiting example, rollers further promote movement of vehicle frame 210 during manipulation to alleviate or prevent inducing stresses due to a positional mis-match between end effectors.

When it is desired to manipulate a part using two robots; providing one robot with a fixed end effector and a second robot with a compliant end effector such as described herein leads to reduced stress on the part and on the robots during manipulation. Parts that have a weight that surpasses a weight limit of a single robot, a part having a length that would be better supported at multiple points; and/or or parts that are otherwise difficult for a single robot to manipulate, assigning two or more robots for a particular process may enhance manufacturing goals and preserve part integrity.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A compliant end effector for a component gripping and manipulating system comprising:
   a robot mounting bracket mountable to a robot manipulating arm;
   a component support member connected to the robot manipulating arm, the component support member configured to be inserted into a component and configured to support the component with clearance such that movement of the component relative to the component support member is allowed, the component support member including a side surface and a top surface;
   a component clamping system including a first clamp member operable to move toward the side surface of the component support member and a second clamp member operable to move toward the top surface of the component support member, the first clamp member configured to press the component against the side surface and the second clamp member configured to press the component against the top surface to fix the component relative to the component support member; and
   a controller operatively connected to the clamping system, the controller configured to engage the first and second clamp members as the component gripping and manipulating system is in a set position and release the first clamp member and the second clamp member allowing a portion of the component held by the component clamping system to move with one or more degrees of freedom, when the component gripping and manipulating system is moving to the set position.

2. The compliant end effector according to claim 1, wherein the component support member includes a first component support member having a first side surface and a first top surface and a second component support member having a second side surface and a second top surface, wherein the first clamp member is operable to move toward the first side surface.

3. The compliant end effector according to claim 1, wherein the component support member includes a first support element fixedly mounted relative to the robot mounting bracket and a second support element engageable with a supported component.

4. The compliant end effector according to claim 3, wherein the second support element is shiftable relative to the first support element.

5. The compliant end effector according to claim 4, wherein the second support element includes the side surface and the top surface.

6. The compliant end effector according to claim 5, wherein the first clamp member urges the supported component against the side surface of the second support element.

7. The compliant end effector according to claim 5, wherein the second clamp member urges the supported component against the top surface of the second support element.

8. The compliant end effector according to claim 1, wherein the second clamp member comprises a rotatable arm connected to a rotary actuator.

9. The compliant end effector according to claim 1, wherein the first clamp member comprises a piston coupled to a linear actuator.

10. The compliant end effector according to claim 1, further comprising a component ground system supported by the component support, the component ground system providing an electrical ground to a supported component.

11. A component gripping and manipulating system comprising:
    a first robot having a first manipulating arm supporting a first component end effector fixedly connected to a first end of a component;
    a second robot having a second manipulating arm supporting a second component end effector compliantly connected to a second end of the component, the second component end effector comprising:
    a robot mounting bracket connected to the second robot;
    a component support member connected to the robot manipulating arm, the component support member configured to be inserted into a component and configured to support the component with clearance such that movement of the component relative to the component support member is allowed, the component support member including a side surface and a top surface;
    a component clamping system including a first clamp member operable to move toward the side surface of the component support member and a second clamp member operable to move toward the top surface of the component support member, the first clamp member configured to press the component against the side surface and the second clamp member configured to press the component against the top surface to fix the component relative to the component support member; and
    a controller operatively connected to the clamping system, the controller configured to engage the first and second clamp members as the component gripping and manipulating system is in a set position and release the first clamp member and the second clamp member allowing a portion of the component held by the component clamping system to move with one or more degrees of freedom, when the component gripping and manipulating system is moving to the set position.

12. The component gripping and manipulating system according to claim 11, wherein the component support member includes a first component support member having a first side surface and a first top surface and a second component support member having a second side surface and a second top surface, wherein the first clamp member is operable to move toward the first side surface.

13. The component gripping and manipulating system according to claim 11, wherein the component support member includes a first support element fixedly mounted relative to the robot mounting bracket and a second support element engageable with a supported component.

14. The component gripping and manipulating system according to claim 13, wherein the second support element is shiftable relative to the first support element.

15. The component gripping and manipulating system according to claim 14, wherein the second support element includes the side surface and the top surface.

16. The component gripping and manipulating system according to claim 15, wherein the first clamp member urges the supported component against the side surface of the second support element.

17. The component gripping and manipulating system according to claim 15, wherein the second clamp member urges the supported component against the top surface of the second support element.

18. The component gripping and manipulating system according to claim 11, wherein the second clamp member comprises a rotatable arm connected to a rotary actuator.

19. The component gripping and manipulating system according to claim 11, wherein the first clamp member comprises a piston coupled to a linear actuator.

20. The component gripping and manipulating system according to claim 11, further comprising a component ground system supported by the component support, the component ground system providing an electrical ground to a supported component.

* * * * *